United States Patent Office 2,929,826
Patented Mar. 22, 1960

2,929,826

PROCESS FOR PREPARATION OF 20-KETO-16-PREGNENES FROM 16-ACYLOXY-20-KETO PREGNANES

Max Oberlin, Basel, Switzerland, assignor to Ciba Pharmaceutical Products Inc., Summit, N.J.

No Drawing. Application February 5, 1958
Serial No. 713,291

Claims priority, application Switzerland February 25, 1957

10 Claims. (Cl. 260—397.4)

This invention relates to the manufacture of keto-steroids.

The degradation of steroid sapogenins to 20-keto-pregnanes possesses great technical importance, since the sapogenins, which occur in nature in large quantities, can thereby be converted into compounds known as important intermediate products for the manufacture both of the highly effective suprarenal cortex hormones (cortisone, hydrocortisone, prednisone, prednisolone and so on) and also of the sex hormones (testosterone and estrone). The degradation of the side chain is carried out, for example, according to the following reaction scheme:

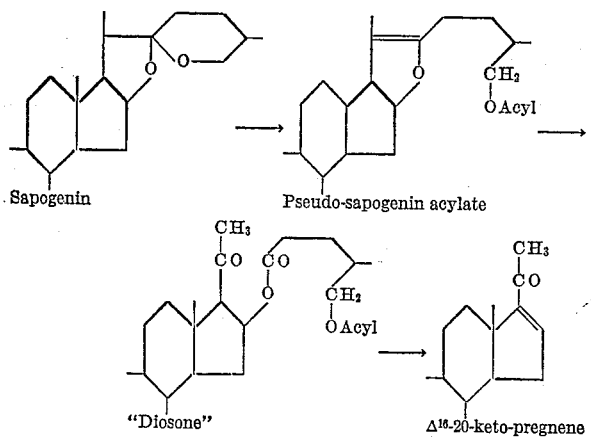

The process of the present invention concerns the conversion of the so-called "diosones," e.g. of the 16-acyloxy-20-keto-pregnanes, obtained by oxidation of the pseudo-sapogenin acylates or of the 20-isosapogenin esters, into $\Delta^{16}$-20-keto-pregnenes.

It is already known, to split off the acyl residue in 16-position of 16-acyloxy-20-keto-pregnane compounds and especially of $\Delta^5$-pregnene-3$\beta$:16-diol-20-on-3-acetate-16-($\delta$-acetoxy)-isocaproate, with the formation of a 16:17-double bond, by the action of acid or alkali. In these cases the alkaline splitting is carried out by means of alkali metal hydroxides, carbonates or bicarbonates in aqueous-alcoholic solution. The acid treatment takes place with mineral acids under similar conditions or also in an anhydrous medium with glacial acetic acid and/or acetic anhydride.

All these processes have the disadvantage that the "diosones" (the oxidation product of the pseudo-sapogenins) must be isolated, so that the above specified treatment is carried out on the crude or purified product. Since the working up of the oxidation mixture of the pseudo-sapogenins takes place by extraction with a water-immiscible solvent, it is necessary that the extract must be evaporated to dryness, after which the residue is subjected to the above described treatment, i.e. in the technical execution of this process an additional reaction stage is necessary. It has also been proposed to carry out the splitting, without isolation of the diosone, in the dehydrated oxidation solution by addition of acetic acid or acetic anhydride. However, this process gives unsatisfactory yields, probably on account of the fact that high temperatures are necessary.

The present invention is based on the observation that $\Delta^{16}$-20-keto-pregnenes are obtained from 16-acyloxy-20-keto-pregnane compounds in an extremely simple manner and in very good yield when they are treated in a water-immiscible solvent with an alkaline reacting salt of a weak acid. It has been found that in this case there can be used directly the extract obtained in the above described oxidation of pseudo-sapogenins, without having first to evaporate the same to dryness. It is sufficient to treat the moist extract with solid alkali metal carbonate or bicarbonate or alkali metal acylate, such as, for instance, sodium or potassium carbonate or bicarbonate, and then to evaporate to dryness as previously. The residue solidifies and consists for the most part of $\Delta^{16}$-20-keto-pregnene.

Of especially favorable effect in this case is, for instance, the use of alkali metal acylates derived preferably from aliphatic or aromatic acids having from 2 to 10 carbon atoms, such as sodium or potassium acetate, propionate or benzoate, in anhydrous form or the form containing water of crystallization, for the reason that during the evaporation a 3-acyloxy group, for example the 3-acetyl group, is not hydrolyzed thereby and thus the desired, valuable $\Delta^{16}$-20-keto-pregnene-3-ol, still completely acylated in 3-position, is obtained directly in a particularly good state of purity. When using an acylate as above described, re-acylation is thus not necessary.

As solvents immiscible with water, for use in the present process, hydrocarbons and chlorinated hydrocarbons are preferable, for example benzene, toluene, chlorobenzene, methylene chloride, ethylene chloride, chloroform or carbon tetrachloride.

It was not to be expected that the presence of, for instance, solid alkali carbonates would be sufficient, in the evaporation of the moist extract immiscible with water, in order to effect the smooth splitting off of the side chain in 16-position. It is quite particularly surprising that even the weak alkalinity of an alkali salt of a carboxylic acid would be sufficient to effect splitting in a heterogeneous reaction medium. Probably owing to the mild effect of the alkali metal acylates, particularly pure $\Delta^{16}$-20-keto-3-acyloxy-pregnenes are thereby produced in very good yield.

The present process not only avoids the disadvantages attached to the various older processes (formation of 16-alkoxy compounds by attachment of alcohols to the 16:17-double bond or partial oxidation to 16:17-epoxides), but is to be preferred to all hitherto known processes on account of its simplicity of technical execution.

There are especially suitable as starting materials for the process, for example, the crude "diosones" obtained by oxidation of pseudo-sapogenin diacylates or 20-isosapogenin acylates of diosgenin, yamogenin, smilagenin, sarsapogenin, tigogenin, hecogenin, 11-ketotigogenin, 12-ketodiosgenin etc.

The following examples illustrate the invention:

Example 1

35.1 gram of crude pseudo-diosgenin diacetate (prepared from 30 grams of crude diosgenin by acetylation and rearrangement with acetic anhydride at elevated temperature) are dissolved in a mixture of 166 cc. of ethylene chloride, 133 cc. of glacial acetic acid and 33 cc. of water. Oxidation is carried out at 0° C. with a mixture consisting of 16.6 grams of chromic acid dissolved in 33 cc. of water and 133 cc. of glacial acetic acid. After the oxidation, the excess of chromic acid is destroyed with sodium bisulphite solution and the reation mixture is then treated with 500 cc. of water, the ethylene chloride layer separated off and the remainder extracted several times with ethylene chloride. The combined ethylene chloride extracts are washed with water and treated with 6.0 grams of solid, powdered, anhydrous potassium carbonate. Evaporation to dryness is then carried out with stirring. The solidified, crystalline residue is heated for 1 hour on the water bath in 100 cc. of acetic anhydride for re-acetylation of the partially hydrolyzed 3-acetoxy group, whereupon gradual cooling is effected to $-15°$ C. and crystallization allowed to take place. Filtration is carried out with strong suction, followed by washing with isopropyl ether and drying. Subsequently, the inorganic constituents present are washed out with warm water and the residue dried under vacuum to constant weight. Yield: 15.0 grams of $\Delta^{5,16}$-$3\beta$-acetoxy-20-keto-pregnadiene of M.P. 173–175° C. (yield 58.2% of the theoretical, calculated on the crude diosgenin).

Instead of the powdered, anhydrous potassium carbonate, the corresponding quantities of anhydrous or hydrated sodium carbonate can be used. The working up and the yields obtained are the same.

From the acetic anhydride mother liquor and the isopropyl ether washings there can be obtained by a suitable process of working up another 4% of the calculated yield of pure $\Delta^{5,16}$-$3\beta$-acetoxy-20-keto-pregnadiene.

Example 2

The procedure is the same as in Example 1 but with the addition of 7.0 grams of solid sodium bicarbonate instead of the potassium carbonate. 15.9 grams are obtained of $\Delta^{5,16}$-$3\beta$-acetoxy-20-keto-pregnadiene of M.P. 173–175° C. (yield 61.7% of the theoretical calculated on crude diosgenin).

Example 3

The ethylene chloride extract obtained according to the directions of Example 1 in the oxidation of pseudo-diosgenin diacetate, after washing with water, is treated with 6.0 grams of anhydrous sodium acetate. After evaporation to dryness, 50 cc. of methanol are added to the solidified crystalline residue, after which boiling under reflux is carried out for ½ hour and if necessary any lumps present are broken up with a glass rod. The whole is then allowed to stand overnight with cooling followed by filtration with suction. The residue is washed with ice-cold methanol, sucked dry and then washed several times with warm water for removal of water-soluble fractions. After drying under vacuum, 17.5 grams are obtained of $\Delta^{5,16}$-$3\beta$-acetoxy-20-keto-pregnadiene of M.P. 173–176° C. (yield 67.9% of the theoretical, calculated on crude diosgenin).

From the methanol mother liquor there can be obtained by a suitable method of working up approximately another 4% of the calculated yield of pure $\Delta^{5,16}$-$3\beta$-acetoxy-20-keto-pregnadiene.

Example 4

19.7 g. of pseudoketotigogenin-diacetate (prepared from 17.6 g. of 11-ketotigogenin) are dissolved in a mixture of 93 cc. of ethylene chloride, 75 cc. of glacial acetic acid and 19 cc. of water. At 0–5° C. the reaction mixture is oxidized with a mixture of 9.3 g. of chromic acid, dissolved in 19 cc. of water and 75 cc. of glacial acetic acid. When the oxidation is complete, the excess chromic acid is destroyed with sodium bisulfite solution, after which 300 cc. of water are added while stirring. The mixture is allowed to stand for a short while and the ethylene chloride solution then separated and the oxidation solution extracted several times with ethylene chloride. The combined ethylene chloride extracts are washed with water, and 8.4 g. of solid potassium acetate are added. The whole is then evaporated to dryness while stirring, degassed, and the crystalline residue mixed with 30 cc. of methanol. The whole is then refluxed for ¼ hour and if necessary any lumps present are broken up. The reaction mass is allowed to stand at 0° C. overnight, then filtered with suction, and washed with about 30 cc. of methanol at $-15°$ C. The product is squeezed well, washed in the filter with about 500 cc. of warm water, and dried in vacuo at 60° C. There are obtained 10.3 g. of $\Delta^{16}$-allopregnene-$3\beta$-ol-11,20-dione-3-acetate of melting point 180–182° C. (corrected). The yield is 67.8% of the theoretical yield, calculated on 11-ketotigogenin. From the methanol mother liquor there can be obtained, after removal of the acetoxy-isocapronic acid, another 3–4% of the theoretical yield of $\Delta^{16}$-allopregnene-$3\beta$-ol-11,20-dione-3-acetate.

Example 5

The procedure is as in Example 3 but instead of the quantity mentioned there of anhydrous sodium acetate there are added 10.0 g. of sodium benzoate. Further working up is carried out as described in Example 3. There are obtained 13.8 g. of $\Delta^{5,16}$-$3\beta$-acetoxy-20-keto-pregnadiene of melting point 173–176° C. The yield is 53.5% of the yield calculated on crude diosgenin.

Example 6

The procedure is the same as in Example 3 but with the use of methylene chloride instead of ethylene chloride. There are obtained 17.0 g. of $\Delta^{5,16}$-$3\beta$-acetoxy-20-keto-pregnadiene of melting point 173–175° C. The yield is 66.0% of the yield calculated on crude diosgenin.

What is claimed is:

1. A process for the manufacture of a $\Delta^{16}$-20-keto-21-unsubstituted pregnene which comprises contacting a 16-acyloxy-20-keto-21-unsubstituted pregnane with an alkali metal salt of a weak acid in a water-immiscible solvent selected from the group consisting of hydrocarbons and halogenated hydrocarbons.

2. A process for the manufacture of a $\Delta^{16}$-20-keto-21-unsubstituted pregnene which comprises the step of contacting the organic extraction solution obtained in the oxidation of a pseudo-sapogenin ester and containing a 16-acyloxy-20-keto-21-unsubstituted pregnane with an alkali metal salt of a weak acid in the presence of a solvent selected from the group consisting of hydrocarbons and halogenated hydrocarbons.

3. A process for the manufacture of a $\Delta^{16}$-20-keto-21-unsubstituted pregnene which comprises the step of contacting the organic extraction solution obtained in the oxidation of a 20-isosapogenin ester and containing a 16-acyloxy-20-keto-21-unsubstituted pregnane with an alkali metal salt of a weak acid in the presence of a solvent selected from the group consisting of hydrocarbons and halogenated hydrocarbons.

4. A process for the manufacture of a $\Delta^{16}$-20-keto-21-unsubstituted pregnene which comprises the step of contacting the crude organic extraction solution obtained in the oxidation of pseudo-diosgenin diacetate and containing a 16-acyloxy-20-keto-21-unsubstituted pregnane with an alkali metal salt of a weak acid in the presence of a solvent selected from the group consisting of hydrocarbons and halogenated hydrocarbons.

5. A process for the manufacture of a $\Delta^{16}$-20-keto-21-unsubstituted pregnene which comprises the step of contacting the crude organic extraction solution obtained in the oxidation of 11-keto-pseudo-tigogenin diacetate and containing a 16-acyloxy-20-keto-21-unsubstituted pregnane with an alkali metal salt of a weak acid in the presence of a solvent selected from the group consisting of hydrocarbons and halogenated hydrocarbons.

6. A process for the manufacture of a $\Delta^{16}$-20-keto-21-unsubstituted pregnene which comprises the step of contacting a 16-acyloxy-20-keto-21-unsubstituted pregnane in a chlorinated hydrocarbon solvent with an alkali metal salt of a weak acid.

7. A process for the manufacture of a $\Delta^{16}$-20-keto-21-unsubstituted pregnene which comprises the step of contacting a 16-acyloxy-20-keto-21-unsubstituted pregnane in ethylene chloride with an alkali metal salt of a weak acid.

8. A process for the manufacture of a $\Delta^{16}$-20-keto-21-unsubstituted pregnene which comprises the step of contacting a 16-acyloxy-20-keto-21-unsubstituted pregnane in a water immiscible solvent selected from the group consisting of hydrocarbons and halogenated hydrocarbons with a member selected from the group consisting of an alkali metal carbonate and bicarbonate.

9. A process for the manufacture of a $\Delta^{16}$-20-keto-21-unsubstituted pregnene which comprises the step of contacting a 16-acyloxy-20-keto-21-unsubstituted pregnane in a water immiscible solvent selected from the group consisting of hydrocarbons and halogenated hydrocarbons with an alkali metal acylate derived from a carboxylic acid having from 2 to 10 carbon atoms.

10. A process for the manufacture of a $\Delta^{16}$-20-keto-21-unsubstituted pregnene which comprises the step of contacting a 16-acyloxy-20-keto-21-unsubstituted pregnane in a water immiscible solvent selected from the group consisting of hydrocarbons and halogenated hydrocarbons with sodium acetate.

References Cited in the file of this patent

UNITED STATES PATENTS

| | | |
|---|---|---|
| 2,335,616 | Tendick | Nov. 30, 1943 |
| 2,352,848 | Marker | July 4, 1944 |
| 2,380,484 | Wagner | July 31, 1945 |
| 2,666,770 | Wall | Jan. 19, 1954 |
| 2,752,370 | Gould | June 26, 1956 |
| 2,782,193 | Djerassi | Feb. 19, 1957 |